A. CROSSE.
PURIFYING LIQUIDS.
No. 5,409. Patented Jan. 6, 1848.
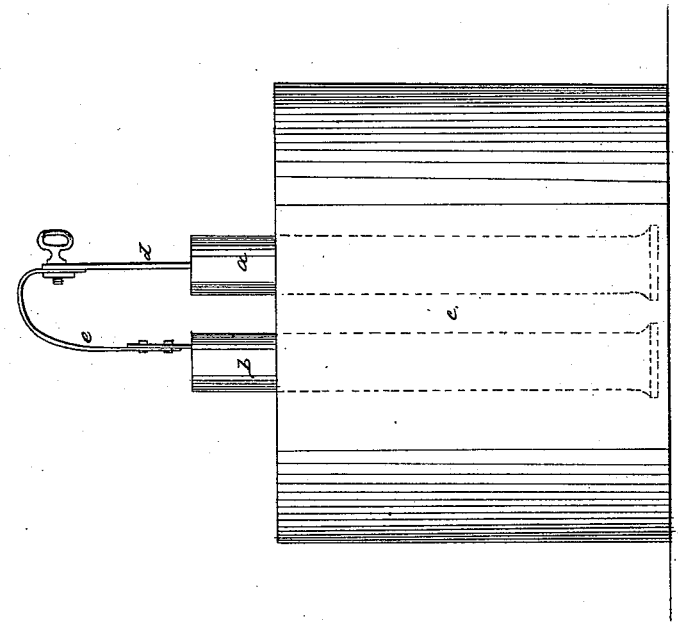
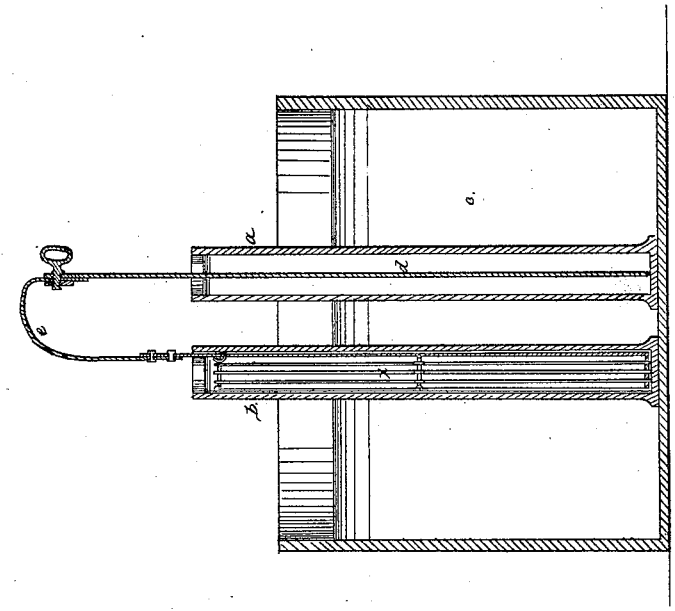

UNITED STATES PATENT OFFICE.

ANDREW CROSSE, OF BROOMFIELD, COUNTY OF SOMERSET, ENGLAND.

IMPROVEMENT IN PURIFYING LIQUIDS BY GALVANISM.

Specification forming part of Letters Patent No. 5,409, dated January 6, 1848.

*To all whom it may concern:*

Be it known that I, ANDREW CROSSE, of Broomfield, in the county of Somerset, esquire, a subject of the Queen of Great Britain, have invented or discovered new and useful improvements in treating fermentable and other liquids so as to cause impurities or matters to be extracted or precipitated; and I, the said ANDREW CROSSE, do hereby declare that the nature of my said invention and the manner in which the same is to be performed are fully described and ascertained in and by the following statement thereof, reference being had to the drawing hereunto annexed, and to the figures and letters marked thereon—that is to say—

My invention consists in applying electric currents to act on fermentable, fermented, or other liquids from which it is desired to extract or precipitate impurities or matters.

In treating wine, beer, or other fermentable or unfermented liquids I can apply electric currents when the same is being fermented, or before or after fermentation. When during fermentation I cause the liquids to be fermented, as heretofore, simply adding the influence of electricity, by which I obtain very beneficial results, and I attenuate such liquids to the same extent as they have respectively before been attenuated, and then cask the liquids and bung them, as heretofore; and I believe the most convenient apparatus for applying electricity to fermented and other liquids is that shown in the drawing, which consists of porous vessels $a$ $b$, which are immersed in the liquid to be operated on, so that the upper part comes above the liquid, and when such apparatus is to be used in or applied to closed vessels containing the liquid to be treated, the upper parts of the vessels $a$ $b$ rise out of the vessel containing the liquid, and the vessels $a$ $b$ are open to the atmosphere.

The apparatus $a$ $b$ and containing-vessel $c$ may be made suitable to operate on five hundred gallons, the vessel $c$ in this case being open, but it may be closely covered, and be of a different shape. I do not, however, confine myself to such arrangement of apparatus, as the same may be varied. Supposing the fermented liquid placed in the vessel $c$ be wine, or beer, or other fermenting liquid, then during the process of fermentation I keep up the influence of the electric apparatus till it is ascertained that the degree of attenuation has been obtained, when I remove the liquid and cask it off and close it. I use water in the porous vessels $a$ $b$, and I have found it desirable to change it daily.

Into the vessel $a$ is placed a sheet of zinc, $d$, and in the vessel $b$, I place a coil or cylindrical frame, $x$, of iron wire, and connect these together by a strip of sheet-iron, $e$, and with respect to fermented liquids I have found that such process materially improves the character of the wine, or beer, or other fermented liquid operated on, also rendering it less liable to become sour.

I have found that applying apparatus suitable for obtaining like electric action on a fermented liquid in a closed cask or other vessel will tend to prevent its becoming acid, in which case electric apparatus such as I have described is to be introduced through the cask or vessel in such manner as to leave the vessels $a$ $b$ open to the atmosphere, and by like means may wine, beer, and other fermented liquids be restored from partial acidity, and preserved from becoming more and more acid.

My invention is also applicable for separating impurities from water, and for this purpose a similar vessel, $c$, and electric apparatus would be used, and the impurities of the water would be precipitated, and any acid and alkaline properties would go to the vessels $a$ and $b$ which are employed, and by such means will water be found to be purified.

In applying the invention to sea-water I first cause the water to be distilled, and then operate by electric action, and I have found the water improved by passing in small streams, through the atmosphere, in addition to operating by electricity.

My invention may also be applied to milk, to preserve it sweet, by constantly removing therefrom by electric action those properties which tend to render milk sour, and this I do by placing milk in an open vessel similar to c, and employ like electric means.

Having thus described the nature of my invention, and the manner in which the same is to be performed, I would have it understood that I do not confine myself to the details; but

What I claim is—

The mode, substantially as herein described, of applying electric action to extract or separate impurities or matters from fermentable, fermented, or other liquids.

ANDREW CROSSE.

Witnesses:
W. H. RITCHIE,
    *Lincoln Inn.*
JOSEPH MARQUELT,
    *Clerk in the Consulate U. S., London.*